United States Patent [19]

Scherubel

[11] Patent Number: 4,796,702
[45] Date of Patent: Jan. 10, 1989

[54] MULTIPURPOSE AQUEOUS FOAMER

[75] Inventor: Gary A. Scherubel, St. Louis, Mo.

[73] Assignee: Petrolite Corporation, St. Louis, Mo.

[21] Appl. No.: 96,261

[22] Filed: Sep. 4, 1987

Related U.S. Application Data

[63] Continuation of Ser. No. 624,065, Jun. 25, 1984, abandoned.

[51] Int. Cl.$^4$ .................. E21B 37/00; E21B 43/26
[52] U.S. Cl. .................... 166/308; 166/309; 166/312; 252/8.551; 252/8.552; 252/355; 252/357; 524/268
[58] Field of Search ............... 766/300, 308, 309, 312; 252/8.551, 8.552, 8.554, 355, 357, DIG. 1, DIG. 7; 524/268, 418, 723; 528/29

[56] References Cited

U.S. PATENT DOCUMENTS

| | | |
|---|---|---|
| 3,304,349 | 2/1969 | Shen .................................. 560/64 X |
| 4,009,256 | 2/1977 | Nowak, Jr. et al. ........ 252/DIG. 13 |
| 4,108,782 | 8/1978 | Thompson ................... 252/8.552 X |
| 4,216,097 | 8/1980 | Stournas ........................... 252/8.554 |
| 4,259,191 | 3/1981 | Wagner .............................. 252/355 X |
| 4,261,869 | 4/1981 | Bishop et al. ............. 252/DIG. 1 X |
| 4,370,243 | 1/1983 | Chen et al. ....................... 252/8.554 |
| 4,383,929 | 5/1983 | Bertocchio et al. ............. 252/355 X |
| 4,404,112 | 9/1983 | Scherubel et al. ........... 252/8.551 X |
| 4,431,789 | 2/1984 | Okazaki et al. ................... 528/29 X |
| 4,450,091 | 5/1984 | Schmolka ................. 252/DIG. 1 X |
| 4,681,165 | 7/1987 | Bannister ............................. 166/312 |

Primary Examiner—George A. Suchfield
Attorney, Agent, or Firm—Robert E. Wexler

[57] ABSTRACT

The invention provides a surfactant mixture, comprising a zwitterionic surfactant, a nonionic surfactant and a cationic surfactant, which forms a foamable liquid composition upon addition to aqueous media including fresh water, brines, acids and water/alcohol mixtures. The foams prepared from the foamable liquid composition have utility as fracturing fluids and well cleaning fluids.

14 Claims, No Drawings

MULTIPURPOSE AQUEOUS FOAMER

This application is a continuation of application Ser. No. 624,065, filed June 25, 1984, now abandoned.

BACKGROUND OF THE INVENTION

A. Field of the Invention

This invention relates to novel foam compositions and methods of using such novel compositions as fracturing fluids and well bore cleaning fluids. In particular, the invention relates to multipurpose aqueous foaming compositions which may be used in any aqueous system.

It is well known that subterranean hydrocarbon-bearing formations may be hydraulically fractured to improve production of same. In the usual processes, various liquids, such as crude oil, kerosene, water, acids, water/alcohol mixtures, brines, foams and the like, are injected into the hydrocarbon formation via an injection well or producing well. By increasing the pressure on the fluid, the formation is placed under hydraulic stress in order to fracture the formation and thereby form channels which more easily allow hydrocarbons to migrate to the surface via the production well.

The fracturing fluid must have a viscosity which is low enough to permit adequate penetration of the formation but, at the same time, sufficiently high that excessive leak-off of the fluid to the formation does not occur. The fracturing fluid must also have sufficient body that it will carry propping agents to all parts of the fractured formation.

Foams meet the various criteria necessary for an efficient fracturing fluid. In the past, however, it has been necessary to tailor the foam to the particular environment encountered in the various formations which are to be fractured. Formations are frequently treated with a variety of fluids prior to and during extended hydrocarbon recovery methods as described above. Thus, a formation frequently has been exposed to fresh water or brines, or the formation may have been acidized with acids such as hydrochloric acid, or, in order to avoid the excessive use of water, such as in clay-containing formations, a water/alcohol mixture is frequently used so that the clay does not swell and close off the formation pores necessary for hydrocarbon migration. Each of the various types of fluids which have been used to assist hydrocarbon production present special problems in the formulation of a foam fracturing fluid. Thus, it has been necessary to formulate specifically tailored foams for injection into formtions which have been treated with fresh water, brines, acids, water-/alcohol mixtures and the like. Foaming agents (i.e. surfactants) which may work efficiently in an acid environment frequently do poorly in fresh water. Further, typical aqueous foaming agents will not foam in the presence of alcohols, which require special surfactants.

Accordingly, an object of the present invention is to provide a multipurpose foamable composition, and the foam generated therefrom for use in aqueous media, which will provide a stable foam for fracturing and well cleaning when formulated with fresh water, brine, aqueous acids and water/alcohol mixtures.

Another object of the invention is to provide a foamable fracturing and well cleaning surfactant composition which forms a stable foam in a variety of aqueous media at reduced loading rates.

A further object of the invention is to provide methods for fracturing hydrocarbon formations and cleaning wells by treatment of a formation or well with a foam prepared from a multipurpose foamable fluid.

Further objects of this invention will be apparent from the disclosure herein.

B. Prior Art

The use of foams, generated from aerated foamable fluids, in the fracturing of hydrocarbon formations and for use in well bore cleanout is well known in the art, however, the prior art does not teach the preparation of a multipurpose aqueous foamer which may be used in environments which have previously been treated with, or contain, fresh water, brine, acids, alcohol/water mixtures or the like. For example:

U.S. Pat. No. 3,463,231 describes the circulation of fluids as well cleaning agents.

U.S. Pat. No. 3,572,440 discloses the use of aqueous foamable fluids containing acids for use in cleaning well bores and to facilitate stimulation of the producing zone of the well as by cleaning it.

U.S. Pat. No. 3,937,283 describes the hydraulic fracturing of hydrocarbon formations using a foamable fluid prepared from a liquid base, e.g., water, brines, acid, oil, hydrocarbon condensates and the like. A surface active foaming agent such as anionic, cationic or non-ionic materials or mixtures thereof, depending on the environment, are used together with a gas.

U.S. Pat. No. 3,980,136 describes compositions and methods for fracturing well formations using a foam having a specified quality. The foam is prepared by adding a surface active agent to a slurry of sand in water and introducing thereto a large amount of gas.

U.S. Pat. No. 4,404,112 describes the use of silicon-induced hydrocarbon foam mixtures suitable for use in well stimulation.

SUMMARY OF THE INVENTION

In accordance with this invention, there is provided a multipurpose foamable liquid composition comprising an aqueous base liquid and a combination of a zwitterionic surfactant, a nonionic surfactant and a cationic surfactant. Appropriate incorporation of a gas into such liquid composition provides a stable foam composition comprising a mixed dispersion of the aqueous liquid base and the surfactant mixture.

The foamable compositions, and the stable foams generated therefrom upon gas injection, find use in the fracturing of hydrocarbon formations, in the cleaning of the bores of injection and production wells and in a variety of other applications.

PREFERRED EMBODIMENTS OF THE INVENTION

The essential aspect of the invention concerns a composition comprising a combination of surfactants which has been found to produce a multipurpose foamable composition when combined with aqueous base fluids. The unique aspect of this invention is the combination of a zwitterionic surfactant, a nonionic surfactant and a cationic surfactant.

Zwitterionic surfactants useful in the practice of the invention are those surfactants containing acidic and basic hydrophile groups which may be any of the nonionic and cationic groups described hereinafter and also those which contain ether or hydroxyl groups, e.g. amino acid salts, alkylbetaines of the formula $RN^+(CH_3)_2CH_2CO_2^-$, wherein R represents coco, decyl, cetyl, lauryl, oleyl and the like; amidopropyl betaines of the formula RCONHCH$_2$CH$_2$CH$_2$N$^+$(CH$_3$)$_2$CH$_2$CH$_2^-$, wherein RCO— represents cocoyl, lauroyl, isotearyl, myristoyl, palmitoyl and the like; sulphobetaines of the formula RN(CH$_3$)$_2$$^+$CH$_2$CH(OH)CH$_2$SO$_3^-$, wherein R represents alkyl, e.g. methyl, ethyl, propyl, aryl, e.g. phenyl, alkaryl, e.g. ethylphenyl, aralkyl, e.g. benzyl and the like and imidazolinium derivatives.

Zwitterionic surfactants useful herein include sulfobetaines, e.g. prepared by the reaction of epichlorohydrin and sodium bisulfite and reacting the resulting product with primary secondary and tertiary amines having the formulas, respectively, RNH$_2$, RNHR' and RNR'R", wherein R, R' and R" represent hydrocarbon groups, e.g. alkyl, cycloalkyl, aryl, alkenyl and heterocyclyl and the zwitterion reaction products described in U.S. Pat. No. 3,304,349 and incorporated herein by reference.

The preferred zwitterionic surfactants are the sulfobetaines described above, especially the inner salt of 1-dodecanaminium, N-(2-hydroxy-3-sulfopropyl)-N,N-dimethyl hydroxide.

Cationic surfactants useful in the practice of the invention include alkali metal salts of fatty acids, e.g. sodium oleate; oxygen-free amines, i.e., aliphatic mono, di and polyamines derived from fatty and rosin acids; oxygen-containing amines such as amine oxides of the formula RN(O)(CH$_3$)$_2$ or RN$-$($C_2H_4$$-$O$-$)$_2$H, wherein R is cetyl, lauryl, myristyl, stearyl, coco, tallow, hexadecyl, oleyl and the like; imidazolines, e.g. of the formula

where R< is coco, lauric, oleic, stearic, caprylic, tall oil and the like; ethylenediamine alkoxylates; aliphatic and rosin amine carboxylates of the formula

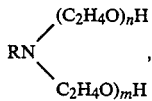

where R is coco, soybean, tallow, stearyl, rosin and the like and m and n are from 1-5; amines with amide linkages, such as tall oil fatty acid condensates with dialkylene and polyalkylene polyamines; quaternary ammonium compounds, e.g. dialkyldimethylammonium salts, benzalkonium halides, alkyltrimethylammonium salts, and alkylpyridinium halides. A preferred cationic surfactant is an ethoxylated tallow amine such as Armeen* T.

*Trademark of Armour & Co.

The zwitterionic surfactants of the invention may contain any of the cationic polar groups described above, including sarcosinates and any suitable moieties of the nonionic surfactants described hereinafter.

Nonionic surfactants useful in the practice of the invention include alkoxylated silicone glycol copolymers of the formula

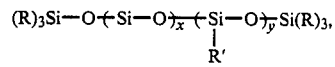

wherein R represents an alkyl, aryl, aralkyl or alkaryl group, e.g. methyl, ethyl, propyl, isopropyl, butyl, isobutyl, amyl, phenyl, phenylethane, diphenylethane, benzyl, ethylphenyl and the like and R' represents an alkoxylate moiety, e.g. —R"O(R"O)$_{\overline{m}}$(R"O)$_{\overline{n}}$H, wherein R" represents ethyl or propyl groups and x, y, m and n represent an integer of from about 1 to about 10; acid derivatives such as tall oil fatty acids, mono- and diglycerol esters of fatty acids, esters of fatty acids and glycols, condensates of alkylene oxides with fatty acids, esters of alkylene glycols, esters of erythritols and glycosides; condensates of alkylene oxides with alcohols, e.g. phenols, naphthols; esters of phosphoric acid with mixed alcohol/glycol; alkoxylated soybean lecithin; alkoxylated disulfimides; sulfones; fatty acid/alkanolamine reaction products and the like. Preferred nonionic surfactants are the Dow Corning 190 and 193 silicone glycol copolymer (dimethicone) surfactants.

The ratio of each of the surfactants to each other in the mixture is from about 0.50 to about 2.00 (zwitterionic) to about 2.00 to about 5.0 (cationic) to about 0.50 to about 2.0 (nonionic). Preferably the ratio is about 1 to about 3.33 to about 0.9.

The base liquids, with which the surfactant combination is mixed, may include any liquid which is predominantly aqueous in character. Such liquids include, for example, fresh water, brines, aqueous acids, aqueous alcohols such as aqueous methanol, aqueous ethanol, aqueous isopropanol and the like.

The concentration of the mixture of surfactant in the base liquid is between about 0.025% and about 1.0%, depending upon the nature of the base liquid.

In order to prepare a foam from the foamable liquid composition comprising the above-described surfactant mixture in base liquid, a gas is introduced into the surfactant-base liquid mixture. Gases which may be utilized to form the foam composition of the present invention include air, carbon dioxide, methane, and other hydrocarbon gases, as well as inert gases such as are well known in the art of forming foams. The gas may be introduced into the foamable composition in any manner such as, for example, by beating air into the foamable composition, as in a Hobart mixer, or by introduction of pressurized gas. The amount of gas which is introduced into the foamable composition is within the scope of those skilled in the art and is generally that amount required to form a stable foam at the pressures encountered in the formation. Thus, the deeper the well, and the higher the downhole well pressure, the more gas is required at the surface to generate a foam of a specific quality, because as the gas travels down the well in the foam, it is compressed and diminishes in volume and therefore the physical properties of the foam changes.

In accordance with the present invention, liquid base to be added to the well is introduced via a line at or near the well bore entrance from a storage tank or truck containing the liquid base. The surfactant mixture is then added to the liquid base and the mixture of surfactant and liquid base is contacted with gas near the entrance to the well bore and is pushed down the well bore and into the hydrocarbon formation, whereby the pressure of the foam hydraulically fractures the formation.

The base liquid may be a slurry of sand, glass beads, nut shells or other usual propping agent in an aqueous medium. The surfactant mixture is added prior to entry of the base liquid to the well entrance and a relatively large amount of gas is introduced, as described above, into the liquid to immediately form a very stable, high quality foam at the surface adjacent to the well entrance. Other materials such as acids, salts, polymers, friction-reducing agents, scale preventives, corrosion inhibitors and the like may be added before foam formation.

The foamable compositions of the present invention form stable foams at greatly reduced loading rates as compared to conventional foaming agent compositions. Thus, the foamable compositions described herein form stable foams at a loading rate of one to two gallons of foamable composition per thousand gallons of base liquid, whereas conventional foaming compositions require from about five to about ten gallons of foaming composition per thousand gallons of base liquid.

The foam composition of the present invention, containing a propping agent if it is used as a fracturing fluid, is introduced at high pressure into the formation in the desired amount to create the desired fracturing area around the well. A foam flush, formed of gas, water and surfactant is usually delivered into the well following the fracturing operation to flush propping agent and other debris from the well.

Normally, after the introduction of the fracturing fluid is complete, the well is shut in until the pressure stabilizes. A small amount of gas is then removed at the well head to cause the foam to break in the well and to lower the pressure in the formation around the well bore. After a period of shut-in time, to allow the formation to settle due to the overburden above the formation, the well is opened to release the gas pressure in the formation. The pressure drop breaks the foam and the gas leaves the formation, carrying with it substantially all of the liquids originally contained in the fracturing fluid. Because of the increased fracture area and because the propping agent is distributed throughout the fracture area, the production from the well is greatly increased.

The amount of propping agent in the foamable composition may be varied to give the desired amount of propping agent in the foam fracturing fluid. The foamable liquid composition, at the mixing juncture, may contain from zero to many pounds of propping agent per gallon of liquid base. The amount of propping agent in the foam fracturing fluid down-hole may contain from zero to as much propping agent per gallon of foam as the foam can hold and as can be pumped into the formation.

A preferred surfactant mixture of the present invention comprises from about 5 to about 20 percent by weight, preferably from about 5 to about 15 percent by weight, particularly about 6.0 by weight zwitterion surfactant, from about 10 to about 50 percent by weight, preferably from about 10 to about 30 percent by weight, particularly about 20% by weight cationic surfactant, from about 1 to about 10 percent by weight, preferably from about 2 to about 8 percent by weight, particularly about 5.5% by weight nonionic surfactant. Additionally, the surfactant mixture may contain solubilizers such as methanol or acetic acid and other normally incorporated additives.

The following examples illustrate specific embodiments of the invention, including the best mode for practicing the invention, but it is to be understood that the examples are illustrative only and the scope of the invention is not to be limited thereby.

EXAMPLES 1-13

The following zwitterionic surfactant was prepared:

| Ingredient | % by Wgt. |
| --- | --- |
| Water | 42.62 |
| NaHSO$_3$ | 9.92 |
| Epichlorohydrin | 8.78 |
| Butyl Cellosolve | 13.36 |
| Dimethyldodecylamine | 20.32 |
| NH$_4$Cl | 5.00 |
| | 100.00 |

To the above, which comprised about 15 percent by weight of the total composition, there was added 20 percent by weight of ethoxylated tallow amine surfactant, 5.5 percent by weight of dimethicone surfactant, 10 percent by weight acetic acid solubilizer and 49.5 percent by weight methanol carrier. The ingredients were mixed in a Hobart mixer and subjected to the following test procedure:

TEST PROCEDURE

1. Add 100 mls of test fluid containing the desired amount of surfactant mixture to the bowl of a Hobart mixer, model K45SS.
2. Turn the mixer on full speed and mix for 3 minutes.
3. Pour the resultant foam into a 1000 ml graduated cylinder.
4. Measure initial foam height, and the time required to drain 50 mls of fluid from the foam.
5. Foam quality is determined by the following equation:

$$\text{Foam Quality} = \frac{V\ Foam - V\ Liquid}{V\ Foam}$$

where:
V Foam = Volume occupied by foam and:
V Liquid = Volume of liquid used.
6. Foam half life is defined as the time required to drain half the fluid volume from the foam.

In general, the foam quality should be at least about 52 or greater, such as from about 52 to 99, for example from about 55 to 90, but preferably from about 60 to 85.

A foam with a quality below 52 is theoretically not a true foam, but a mixture of gas bubbles suspended in a liquid, and may not function as well as a true foam. However, under proper conditions these foams having foam quality below 52 can also be used in this invention, provided they can perform the intended function.

The results of the tests are presented in the following Table 1.

TABLE 1
FOAM TEST DATA

| Ex. | Foam | Foam Added (ml.) | Medium | Initial Height (ml) | Half Life | Final Height (ml) |
|---|---|---|---|---|---|---|
| 2 | Ex. 1 | 0.1 | 20:80 i-PrOH/$H_2O$ | >1000 | 11 min. 37 sec. | >1000 |
| 3 | " | " | 30:70 i-PrOH/$H_2O$ | >1000 | 10 min. 27 sec. | " |
| 4 | " | 1.0 | 40:60 i-PrOH/$H_2O$ | 180 | 31 sec. | 175 |
| 5 | " | 0.1 | 20:80 EtoH/$H_2O$ | 600 | 8 min. 2 sec. | 600 |
| 6 | " | 0.5 | 30:70 EtoH/$H_2O$ | >1000 | 14 min. 41 sec. | >1000 |
| 7 | " | " | tap $H_2O$/ 5% kerosene | 550 | 3 min. 58 sec. | 510 |
| 8 | " | 0.1 | tap $H_2O$ | 740 | 5 min. 5 sec. | 740 |
| 9 | " | " | Sea $H_2O$ | 945 | 5 min. 12 sec. | 945 |
| 10 | " | 0.5 | 15% HCl/$H_2O$ | 380 | 3 min. 3 sec. | 380 |
| 11 | " | 0.1 | 50:50 MeOH/tap $H_2O$ | 300 | 5 min. 11 sec. | 300 |
| 12 | " | 0.3 | 60:40 MeOH/tap $H_2O$ | 310 | 5 min. 21 sec. | 310 |
| 13 | " | 1.0 | 75:25 MeOH/tap $H_2O$ | 200 | 3 min. 6 sec. | 200 |

The data show that:
1. The surfactant mixture of Example 1 foams a wide variety of fluids not foamable by any other single surfactant.
2. The foams of Example 1 produced exhibit the stability required for well stimulation purposes.
3. Loading levels required of the Example 1 foams are 2-5 times lower than loading levels required for conventional foamers.

EXAMPLES 14-17

In these examples, the test procedure of Examples 1-13 was followed in evaluating foams prepared from tap or sea water and the zuitterion of Example 1 or the dimethicone nonionic surfactant of Example 1 or the ethoxylated tallow amine cationic surfactant of Example 1 or a 50:50 molar mixture of the zwitterion of Example 1 and a nonionic surfactant which is an ethylene oxide/alkylphenol condensate.

The results are set forth in the following Table 2:

TABLE 2

| Ex. | Medium | Surfactant % | Initial Height (ml) | Half Life | Final Height (ml) |
|---|---|---|---|---|---|
| 14 | Tap Water | 0.1 zwitterion of Ex. 1 | | NO FOAM | |
|  | Sea Water |  | 790 | 34 sec. | 700 |
|  | Methanol/water (50/50) |  |  | NO FOAM |  |
| 15 | Tap Water | 0.1 dimethicone | 240 | 12 sec. | 240 |
|  | Sea Water |  | 225 | 5 sec. | 225 |
|  | Methanol/water (50/50) |  | 150 | 14 sec. | 150 |
| 16 | Tap Water | 0.1 Ethoxylated tallow amine | 1000 | 9 min. 37 sec. | 1000 |
|  | Sea Water |  | 200 | 11 sec. | 200 |
|  | Methanol/water (50/50) |  | 395 | 5 min. 1 sec. | 395 |
| 17 | Tap Water | 0.1 of 50:50 mol mixture of zwitterion of Ex. 1 and EO/phenol | 620 | 3 min. 14 sec. | 620 |
|  | Sea Water |  | 515 | 42 sec. | 515 |
|  | Methanol/water (50/50) |  | 230 | 2 min. 3 sec. | 230 |

The data show that the zwitterionic, nonionic and cationic surfactants, alone (Exs. 14-16) do not form quality, stable foams in a variety of aqueous media as does the composition of the invention (note Table 1). Further, even a combination of zwitterionic and nonionic surfactants (Ex. 17) do not form comparable foams in various media of a quality and stability as are formed by the composition of the invention.

EXAMPLE 18

It is desired to stimulate production from a water sensitive gas well in South Texas. A 60% aqueous methanol frac fluid is necessaary since water could damage the formation. The well is fractured with 20,000 gallons of 60% aqueous methanol, foamed with nitrogen to produce an 80 quality foam. the surfactant mixture of Example 1 is used at a volume of 5 gallons surfactant per 1000 gallons of aqueous methanol. The frac fluid carries with it 1-2 pounds of 20-40 mesh sand per gallon to serve as props for the fracture.

On completion of the frac job by releasing pressure the load is allowed to flow back, leaving the sand in place to prop the fracture.

EXAMPLE 19

This example illustrates the use of a foam containing HCl to remove carbonate scale deposits. Since the foam has low leak-off properties, and greatly expands the volume of a given liquid, this greatly increases the "reach" of the quantity of solvent.

In this example 5000 gallons of 15% HCl containing 5 gallons of foaming agent, based on the surfactant mixture of Example 1, is foamed with nitrogen to produce an 80 quality foam, and pumped into the well. This is followed by 2500 gallons of water, foamed with nitrogen to produce an 80 quality foam, to force the HCl foam further into the formation. The pressure is then released and the fluids allowed to flow back to the surface.

EXAMPLE 20

In this example it is desired to clean out crushed 20-40 mesh frac sand from the well bore of a gas well. Since this is a water sensitive formation it was desired to foam the brine which is produced from the formation.

The surfactant mixture of Example 1 is used at a concentration of 1 gallon per thousand gallons of brine. The brine is foamed with nitrogen to produce a 60 quality foam. The foam is pumped through coil tubing down to the crushed frac sand, carrying the sand up the annulus to the surface.

While the illustrative embodiments of the invention have been described here and above with particularity, it will be understood that various other modifications will be apparent to and can be readily made by those skilled in the art without departing from the spirit and scope of the invention. Accordingly, it is not intended that the scope of the claims appended hereto be limited to the examples and description set forth herein but rather that the claims be construed as encompassing all of the features of patentable novelty which reside herein, including all features which would be treated as equivalents thereof by those skilled in the art to which the invention pertains.

I claim:

1. An aqueous composition containing from about 0.025 to about 1.0 percent by weight of a composition comprising from about 5 to about 20 percent by weight zwitterionic surfactant, from about 10 to about 50 percent by weight cationic surfactant and from about 1 to about 10 percent by weight nonionic surfactant.

2. Composition of claim 1 comprising from about 5 to about 15 percent by weight zwitterionic surfactant, from about 10 to about 30 percent by weight cationic surfactant and from about 2 to about 8 percent by weight nonionic surfactant.

3. Composition of claim 2 comprising about 6 percent by weight zwitterionic surfactant, about 20 percent by weight cationic surfactant and about 5.5 percent by weight nonionic surfactant.

4. Composition of claim 2 comprising about 15 percent by weight zwitterionic surfactant, about 20 percent by weight cationic surfactant and about 5.5 percent by weight nonionic surfactant.

5. Composition of claim 1 wherein said zwitterionic surfactant is a sulfo-betaine.

6. Composition of claim 1 wherein said cationic surfactant is an ethoxylated tallow amine.

7. Composition of claim 1 wherein said nonionic surfactant is a silicone glycol polymer.

8. A foam resulting from incorporation of a gas into the composition of claim 1.

9. Method of fracturing a subterranean hydrocarbon-bearing formation comprising injecting a foam of claim 8 into said formation.

10. Method of cleaning a well bore comprising injecting a foam of claim 8 under pressure into said bore via tubing in said bore and allowing said foam to return to the surface via the well annulus.

11. Composition comprising a sulfo-betaine, an ethoxylated tallow amine and a silicone glycol polymer.

12. A foam resulting from incorporation of a gas into the composition of claim 11.

13. Method of fracturing a subterranean hydrocarbon-bearing formation comprising injecting a foam of claim 12 into said formation.

14. Method of cleaning a well bore comprising injecting a foam of claim 12 under pressure into said bore via tubing in said bore and allowing said foam to return to the surface via the well annulus.

* * * * *